United States Patent [19]
Cencel
[11] 3,750,113
[45] July 31, 1973

[54] CAPACITIVE KEYBOARD

[75] Inventor: J. Arthur Cencel, Sherman Oaks, Calif.
[73] Assignee: Becton, Dickinson Electronics Company, Rutherford, N.J.

[22] Filed: Nov. 12, 1971
[21] Appl. No.: 198,268

[52] U.S. Cl...... 340/173 SP, 340/173 CA, 317/242, 200/181
[51] Int. Cl........................ G11c 11/24, G11c 17/00
[58] Field of Search................ 317/242; 340/173 SP

[56] References Cited
UNITED STATES PATENTS

| | | | |
|---|---|---|---|
| 2,664,546 | 12/1953 | Goodale | 340/173 SP |
| 2,814,031 | 11/1957 | Davis | 340/173 SP |
| 3,129,418 | 4/1964 | De La Tour | 340/345 |
| 3,419,697 | 12/1968 | Gove | 340/173 SP |

*Primary Examiner*—Terrell W. Fears
*Attorney*—Leonard Golove, Marvin H. Kleinberg et al.

[57] ABSTRACT

A n-key capacitive keyboard is coupled to an n-bit shift register. Each key is sequentially "interrogated" and, if actuated, an output pulse appears which is applied to the input of the shift register. The output pulse is also compared to the output of the shift register, corresponding to the "state" of the key in the prior cycle. An output pulse is generated on the first occurrence of a signal representing actuation of the key. The output of the shift register is also applied to make the key circuit more sensitive and therefore require less key travel to pass the interrogating pulse.

5 Claims, 4 Drawing Figures

INVENTOR.
J. ARTHUR CENCEL
BY Golove, Kleinberg & Morganstern
GOLOVE, KLEINBERG & MORGANSTERN
ATTORNEYS INVENTOR.
J. ARTHUR CENCEL
BY Golove Kleinberg & Morganstern
GOLOVE, KLEINBERG & MORGANSTERN
ATTORNEYS

CAPACITIVE KEYBOARD

The present invention relates to capacitive keyboards and more particularly to an improved capacitive keyboard utilizing digital circuitry.

In information handling systems and data processing applications, keyboards have been utilized for introducing information into a system. In the past, contact-type keyboards have been extensively employed as data entry apparatus, and problems of reliability, contact bounce, and the like, as well as mechanical complexity have resulted. Moreover, a plurality of diodes, frequently as many as one per key, were required to prevent signal sneak paths.

In an attempt to avoid many of these problems, capacitive type keyboards were employed, in which the action of the key does not result in a switch closure, but rather changes the capacitance in a circuit, enabling the transmission of an A.C. signal representing information.

In prior art capacitance keyboards, such as are described in the patent to D. C. Gove, U.S. Pat. No. 3,419,697, (for example, in connection with FIG. 6), a key includes a shielding plate which is interposed between the plates of a keyboard capacitor. An oscillator, which generally provides a relatively high voltage sinusoidal signal, is commonly connected to one of the plates and a second plate is connected to an amplifier which, in turn, provides the output representative of the actuation of the key.

A plurality of sense amplifiers, generally connected as high impedance amplifiers, are usually required, one for each key. In addition to the amplifiers, there may be provided code converting circuits which respond to the input of a particular amplifier, to generate a combination of signals, which signal combination uniquely identifies the key that had been depressed.

The required oscillator and several amplifiers represent a substantial cost factor when building a multi-key keyboard. Moreover, when dealing with the output of an oscillator, analog-type circuits are required to deal with the sinusoidal signals that are being transmitted. Additional circuitry is necessary if these signals are ultimately converted into another format for transmission and/or utilization.

Yet another adverse factor in the use of a conventional capacitive keyboard, is the problem of the relatively high voltages which are employed in the system for the efficient operation of the oscillator and the various amplifiers and encoding circuits. Generally, such equipment must be adequately shielded to protect the operator from stray electrical energy.

In recent years, great strides have been made in the development of high speed digital circuits of great reliability that are available at extremely low cost in extremely small packages. Digital modules are now available in "micro-circuit" form mechanizing complex logical functions which can frequently be placed on a single "chip" which operates at very low, computer-compatible voltages, and at very high, computer-compatible speeds.

Micro-circuits also mechanize other complex digital circuits, such as counters, shift registeres, multiplexers and demultiplexers. Yet other circuits provide clock generators and logical circuits, such as "and" and "or" gates, flip-flops and monostable multivibrators or "one shots" on a "chip" or module.

It has been deemed desirable to incorporate in a keyboard, the simplicity of the contact-type switch keyboard with the reliability and freedom of mechanical instabilities of the capacitive keyboard.

According to the present invention, an *n*-bit shift register functions as a memory for an *n*-key keyboard. A single clock generator sequentially energizes each key of the keyboard and simultaneously causes the state of each key to be stored in a different cell of the register associated therewith. During each interrogation cycle, the shift register stores signals representative of and corresponding to the state of each key, whether actuated or not.

On a next cycle, the new state of each of the keys of the keyboard can be readily compared with the state of the key during the prior cycle and the new state is stored in the register, replacing the information formerly stored therein.

Logical circuitry recognizes the simultaneous occurrence of a signal from the keyboard representing the energization of the key and the simultaneous presentation of the signal indicating that the key was not actuated in the prior cycle. On this occurrence, an output signal is provided which temporarily stops the clock generator and provides an output signal corresponding to and representative of the energized key. In addition, a data storage device which can be addressed by the clock generator may be used to provide an output message corresponding to and representative of the energized key.

According to a preferred embodiment of the present invention, there is provided a capacitive keyboard with a matrix of columns and rows. The keys are arranged in "rows" and the keyboard output is arranged in columns. A 64 key keyboard, for example, is arranged in an eight-by-eight matrix with eight rows of eight keys per row.

A six bit binary counter, driven by a clock generator, utilizes the three least significant bits to drive a one-out-of eight decoder which sequentially selects the rows of the keyboard. The most significant three bits of the counter are used to drive a multiplexer, which sequentially selects the eight columns of the keyboard for an output.

The objects of the invention are:

Accordingly, it is an object of the invention to provide an improved capacitive keyboard suitable for a data entry device.

It is yet an additional object of the invention to provide a capacitive keyboard that does not require a plurality of detectors.

It is yet an additional object of the invention to provide an improved capacitive keyboard that provides a limited number of sense amplifiers.

It is yet an additional object of the invention to provide an improved capacitive keyboard which removes the need for isolation diodes.

It is yet another object of the invention to provide an improved capacitive keyboard which inexpensively furnishes an n-key rollover capability.

It is yet an additional object of the invention to provide an improved capacitive keyboard which utilizes inexpensive, readily available sense amplifiers.

It is yet a further object of the invention to provide an improved capacitive keyboard which includes an electronic hysteresis circuit that increases the sensitivity of an actuated key.

The novel features which are believed to be characteristic of the invention, both as to organization and method of operation, together with further objects and advantages thereof will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figure 1:
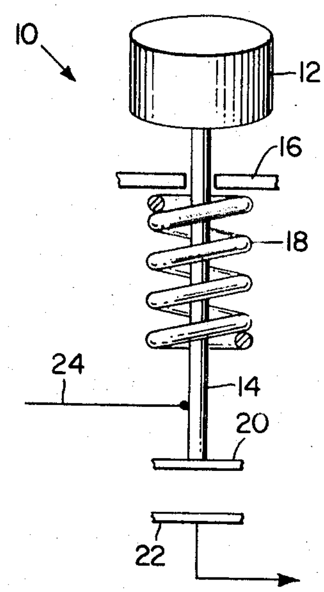
FIG. 1 is an idealized diagram of a single capacitive key which can be utilized in the present invention.

Turning first to FIG. 1, there is shown an idealized capacitance key which can be utilized in the keyboard of the present invention. The key 10 includes a push-button portion 12, a shaft 14, a cover plate 16, which may be part of the supporting frame, and a spring member 18, which acts to return the key after energization.

The key 10 is terminated in a first plate 20, which is brought into proximity to a second plate 22 that is coupled to the key output circuits. An input pulse signal is applied to the shaft 14 by input line 24.

In operation, a pulse signal is applied to input line 24 and the shaft 14 to the first plate 20. So long as the key is unactuated, the separation between the first and second plates 20, 22 prevents effective capacitive coupling. However, when the push-button 12 is depressed, actuating the key 10, the first and second plates 20, 22 are brought into sufficiently close proximity that there is a substantial capacitive coupling between them. The pulse signal applied to input line 24 is then transmitted to an output line 26 connected to the second plate 22.

It is clear that, depending upon the characteristics of the input signal and the "noise" in the system, some capacitive coupling between first and second plates 20, 22 is present at all times. However, once the key 10 has travelled a certain predetermined distance, the magnitude of the transmitted signal will exceed a predetermined threshold and will be recognizable as an indication that the key 10 has been actuated.

Figure 2:
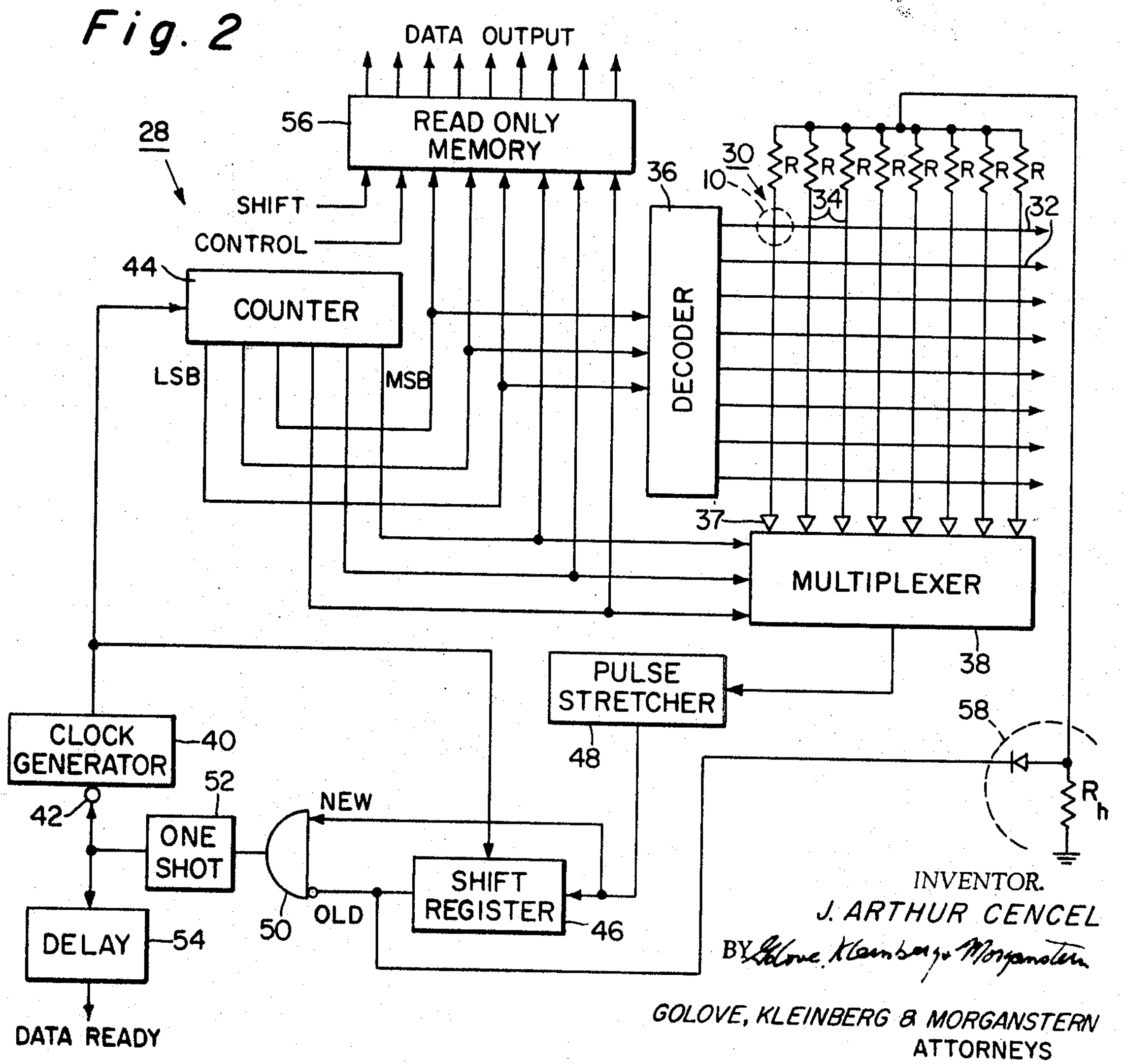
FIG. 2 is an idealized block diagram of the keyboard system according to the present invention.

Turning next to FIG. 2, there is shown in diagrammatic form, a capacitive keyboard 28 according to the present invention. A keyboard which is arranged in an eight-by-eight matrix of eight columns, each having eight rows, may employ 64 keys 10, such as were illustrated in FIG. 1, above.

In FIG. 2, the keyboard 28 has been shown as an eight-by-eight matrix 30, in which each crosspoint represents a key 10 (not shown). A 1-out-of-8 decoder 36 sequentially addresses the eight rows 32 of the matrix 30. As shown, each row is commonly connected to 8 keys. The 8 columns 34 are individually connected through amplifiers 36 to a multiplexer 38. Each column 34 can be capacitively coupled to a row 32 by the actuation of a key 10.

A clock generator 40, which may be a free-running oscillator, provides the basic timing and synchronizing signals to the remainder of the system. An inhibit input 42 is connected to receive a signal which, when received, stops the operation of the clock generator 40.

The pulse output of the clock generator 40 is simultaneously applied to a six-bit binary counter 44 and to the shift input of a sixty-four-bit shifting register 46. The binary counter 40 provides an output from each stage.

The three Least Significant Bits are applied to the decoder 36 which selects a different row 32 in response to each signal combination applied on the three Least Significant Bit lines. The three Most Significant Bits of the counter 44 are applied to the multiplexer 38 to select for an output one of eight column 34 inputs.

The output of the multiplexer 38 is applied to a pulse stretcher circuit 48 which is coupled to the sixty-four-bit shift register 46 and to one input of a two-input and gate 50, the other input of which is an "inhibit" input that is coupled to the output of the shift register 46.

The output of the "and" gate 50 is connected to a one-shot circuit 52. The one-shot circuit 52 may be a conventional, monostable multivibrator circuit that provides an output pulse of predetermined duration in response to an applied input pulse. The output of the one-shot 52 is applied, through a delay circuit 54, to provide Data Ready signals to a utilization device.

The one-shot 52 output is also applied to the inhibit input terminal 42 of the clock generator 40, thereby temporarily disabling the clock generator 40 during the operation of the one-shot 52.

The six output lines of the binary counter 42 are also applied to address a read-only memory 56, which can provide a unique data message for each combination of binary digits applied at its input. The count, at all times, represents the address of a key 10 and of a corresponding message in the memory 56.

A hysteresis circuit 58, explained in greater detail in connection with FIG. 3 below, receives the signal output of the shift register 46 and operates to increase the sensitivity of an actuated key. While the manner of accomplishing this end will be explained below, for the purposes of the present discussion, it is sufficient to note that the hysteresis circuit 58 electronically changes the key actuation threshold by permitting a signal to be transmitted effectively through a wider range of plate separations.

Figure 3:
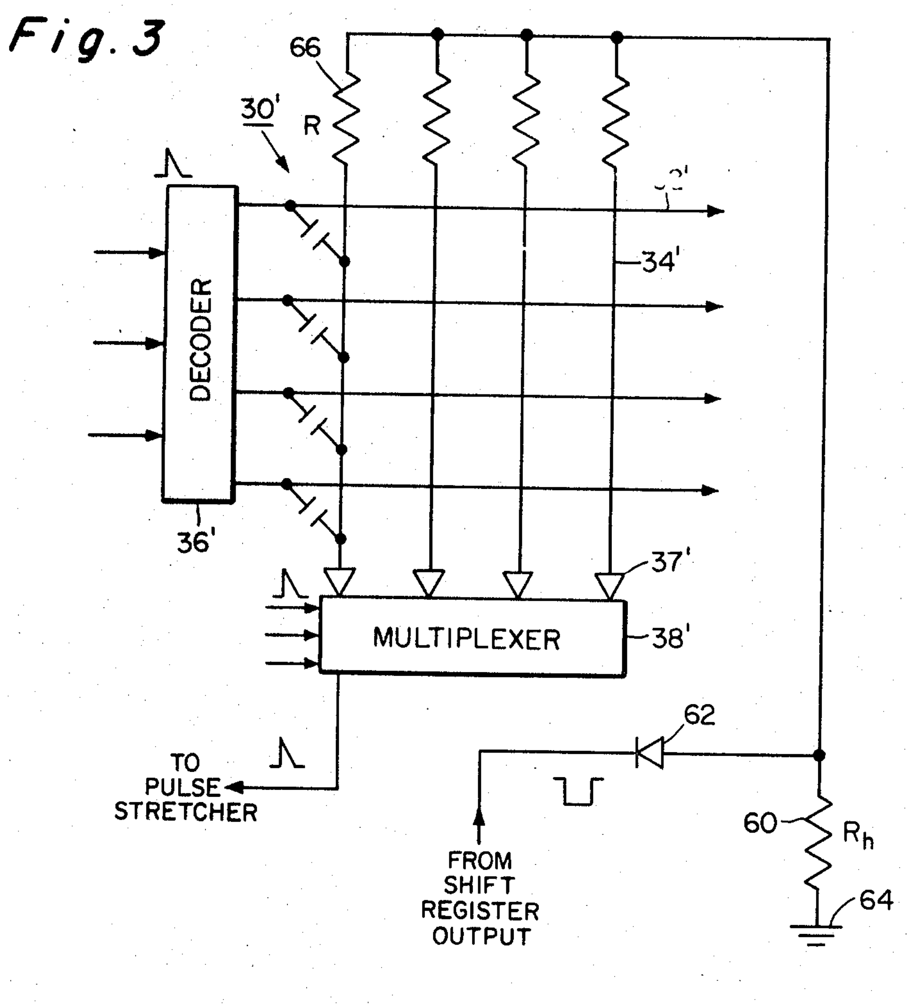
FIG. 3 is a combination block and circuit diagram illustrating the hysteresis circuit of FIG. 2 in greater detail.

Turning now to FIG. 3, there is shown in somewhat greater detail, the "hysteresis" circuit. For convenience, a matrix 30' is illustrated which is a four-by-four matrix. As in the embodiment of FIG. 2, a decoder 36' selects rows 32' and a multiplexer 38' selects columns 34'.

The hysteresis circuit includes a diode 62 which is connected between the output of the shift register 46' which, in this example, would store sixteen bits for the four-by-four matrix 30'. A resistor $R_h$ 60 has one end connected to common reference potential, indicated by conventional ground symbol 64. The other end of the $R_h$ resistor 60 is connected to the junction of the diode 62 and the several column lines 34'.

In each column line 34', there is a resistor 66 which establishes an impedance path between an amplifier 37' connected to the multiplexer 38' and common 64, through the hysteresis resistor $R_h$ 60.

Normally, a signal capacitively coupled to a column 34' from a row 32' would see a bias voltage at the sense amplifier 37', established by the series combination of a resistor R 66 and the hysteresis resistor $R_h$ 60 to common 64. If a key had been activated on a prior interrogation cycle, thereby storing a bit in the shift register 46', when the same key is "addressed" again, a pulse is applied to the diode 62, effectively creating a shunt path to the hysteresis resistor $R_h$ 60 and substantially lowering the bias of the amplifier 37'.

Accordingly, a signal on the row line 32' of smaller magnitude will still be effective to exceed the threshold of the amplifier. Therefore, the plate separation can be increased and the amplifier 68 will still respond to the pulse signal.

The effect of this change in bias is reflected in the range of positions that a key might occupy once it has been energized sufficiently to transmit a pulse. Until the key is completely released, a signal will be transmitted over a wider range of plate separations. The magnitude of the hysteresis resistor $R_h$ 60 determines the extent to which the sensitivity of the circuit is increased and would also determine the amount of travel required before the key appeared to present an effective open circuit to an applied pulse signal.

Figure 4:
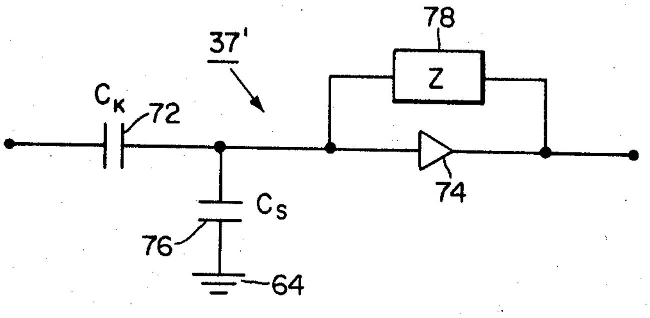
FIG. 4 is an idealized diagram of an improved sense amplifier.

Finally turning to FIG. 4, there is shown a representation of the improved sense amplifier 37 that is of particular value in the present invention. With reference to the Figure, an input line has a single key capacitor $C_k$ 72 that is in series connection with the input to an amplifier 74. A second capacitor $C_s$ 76, represents all other capacitances including stray capacitances between the input line and common is connected in parallel with the key capacitor 72. A feedback loop 78, including an impedance Z, couples the amplifier output to the input to provide substantially unity gain to an applied signal.

Operated in this configuration, the voltage swing at the input of the amplifier is relatively small and, since it is small, the effect of stray capacitance $C_s$ on the current is also small. Therefore, the current becomes primarily a function of the capacitance $C_k$ of the interrogated key only. Since the output signal is a function of the input signal, that output signal would also be a function of the key capacitance $C_k$. If multiple keys are depressed in the same line, their capacitances would contribute to the value of $C_s$, but would have no appreciable effect on the net gain.

It has also been determined that a current amplifier approach greatly minimizes cross talk from the keys in one column to another when in operation. Accordingly, the improved amplifier improves overall performance of the system by improving the response to the addressed key and reducing the adverse affects of other operated keys of the keyboard.

Although the preferred embodiment employed negative feedback to achieve a current amplification mode of operation of the amplifier and to minimize the input voltage swing on the sense amplifier line, it is also possible to load the input of a voltage mode sense amplifier so heavily that any capacitance contributed by a second key is effectively swamped and would not adversely effect the operation of the system.

Thus there has been shown an improved, capacitance keyboard of $m \cdot n$ keys providing a $m \cdot n$ key roll-over. A limited number of sense amplifiers ("m" or "n") are required and the amplifiers are, in a preferred embodiment, operated in the current mode A $m \cdot n$ shift register, having a stage corresponding to each key, is utilized to "remember", from cycle to cycle, whether a particular key is energized. Further, after a key has been energized, the shift register, in cooperation with a hysteresis circuit, increases the sensitivity of an energized key to prevent erroneous indications of multiple actuations through "bounce" or "teasing" of a key.

What is claimed as new is:

1. A data entry comprising, in combination:
a. pulse generating means;
b. an output terminal;
c. a plurality of keys adapted for individual actuation, each key having a different significance in the entry of data;
d. a corresponding plurality of capacitive elements, each connected to a respective key and adapted to have the capacitance modified in accordance with the actuation of the corresponding key, for selectively transmitting pulses applied thereto; and
e. addressing means commonly connected to said capacitance elements and to said pulse generating means and output terminal for sequentially applying pulses to said capacitance elements and for applying the selectively transmitted pulses therefrom to said output terminal in a predetermined order.

2. The data entry system of claim 1, above, further including:
low-impedance sense amplifier means commonly connected to said capacitance elements through said addressing means for providing an output signal representative of and corresponding to an actuated key.

3. The data entry system of claim 2, above, wherein said low-impedance sense amplifier means operates in the current amplifying mode.

4. A data entry system comprising in combination:
a. pulse generating means;
b. a plurality of keys adapted for individual actuation, each key having a different significance in the entry of data;
c. a corresponding plurality of capacitive elements, each connected to a respective key and adapted to have the capacitance modified in accordance with the actuation of the corresponding key, for selectively transmitting pulses applied thereto;
d. input addressing means commonly connected to said capacitance elements and to said pulse generating means for sequentially applying pulses to said capacitance elements in a predetermined order; and
storage means, including a plurality of storage elements each respectively corresponding to a different key, coupled to said capacitive elements, said storage means operating in synchronism with said input addressing means for applying the output representative of each key to the storage element respectively corresponding thereto.

5. The data entry system of claim 4, above, further including hysteresis means coupled to said storage means and responsive to output signals therefrom representing an actuated key for increasing the sensitivity of the capacitive element corresponding to the selected key, thereby permitting the transmission of pulses over a wider range of key actuations.

* * * * *